US006778539B1

(12) United States Patent
Rygh (10) Patent No.: US 6,778,539 B1
(45) Date of Patent: Aug. 17, 2004

(54) MULTILEVEL TABLE ROUTING (75) Inventor: Hans Rygh, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/520,064

(22) Filed: Mar. 7, 2000

(51) Int. Cl.[7] ............................................. H04L 12/56
(52) U.S. Cl. .................. 370/401; 370/389; 370/395.32; 711/216
(58) Field of Search .................. 370/252, 254, 370/256, 389–406, 408, 409; 709/243–245; 711/216–218

(56) References Cited

U.S. PATENT DOCUMENTS

| | | | | |
|---|---|---|---|---|
| 4,864,559 A | * | 9/1989 | Perlman | 370/390 |
| 5,305,305 A | * | 4/1994 | Harper et al. | 370/252 |
| 5,633,858 A | * | 5/1997 | Chang et al. | 370/392 |
| 5,721,819 A | * | 2/1998 | Galles et al. | 709/243 |
| 6,061,350 A | * | 5/2000 | Min | 370/389 |
| 6,061,712 A | * | 5/2000 | Tzeng | 370/392 |
| 6,223,172 B1 | * | 4/2001 | Hunter et al. | 707/3 |
| 6,658,482 B1 | * | 12/2003 | Chen et al. | 709/245 |

* cited by examiner

*Primary Examiner*—Steven H D Nguyen
(74) *Attorney, Agent, or Firm*—Park, Vaughan & Fleming LLP (57) ABSTRACT

A method of using routing tables. In this method, routing differs from ordinary table routing in that the part of a destination address (e.g., DestinationID) used for a table lookup is variable. Networks using the full address space of a network node can be made by partitioning the network topology into several levels, such as a top topology and any number of sub-topologies. With a DestinationID of N−1 bits, a routing table of $2^n$ entries is sufficient to support topologies using the full address space, wherein n<N−1.

4 Claims, 11 Drawing Sheets

Figure 10. Example

MULTILEVEL TABLE ROUTING

FIELD OF THE INVENTION

The present invention relates to a method for routing data cells in a multi-node communication network, and to a programmable, distributed network routing system for routing data cells in a multi-node communication network.

BACKGROUND OF THE INVENTION

To use lookup tables have for some time been considered to be the best way to do routing in a SAN (System Area Network). A typical address space in a SAN is usually very large (e.g. 64 k nodes, i.e. 16-bit addresses). However, with current technology it is not feasible to have on-chip routing tables that are big enough to directly support topologies that use the full address space of 64 k, and at the same time keep the routing table lookup latency minimal. A reasonable table size would be in the range 256 to 1024 entries, using respectively 8 or 10 bits of a (e.g.) 16-bits DestinationID for routing. According to current thinking, this will limit the size of the SAN network to respectively 256 or 1024 SAN nodes.

U.S. Pat. No. 5,721,819 describes a method for routing data cells in a computer network based on two routing tables. The first routing table is used to route cells to local nodes while the second routing table is used to route cells to remote nodes.

U.S. Pat. No. 5,574,849 discloses a method for routing data cells in a computer network using a routing table in combination with algorithmic routing.

The disadvantage with the routing method In U.S. Pat. No. 5,721,819 is the requirement of two routing tables, which consumes expensive chip area. Although the routing solution in U.S. Pat. No. 5,574,849 reduces the chip area, it is not a very flexible solution because fixed parts of the cell's destination address is used for routing table lookup and algorithmic routing decisions. This enforces topology restrictions.

In ordinary table routing the routing table must have at least as many entries as the size of the topology. If a topology needs to have as many as 64 k nodes, a lookup table with 64 k entries is required. This is the most flexible solution. The disadvantage-of this would be, as mentioned, that the size of the routing table is large and hence consumes valuable chip area, and that the latency for routing table lookup increases proportionally.

The object of the present invention is to provide a solution to the problems presented above.

SUMMARY OF THE INVENTION

In accordance with a first aspect the invention provides a method for routing data cells in a multi-node communication network, comprising a plurality of routers including respective router tables, forming a top topology and at least one sub-topology, each sub-topology being strictly hierarchical dependent on a parent node in the top topology, the number of sub-topologies being $2^{N-n}$, the destination address of the data cell being N bits, and the size of the router tables being $2^n$ bits, the method comprising the following steps:

comparing a first group of N−n bits of the destination address of the data cell with a router mask, to determine whether the data cell is in a correct or a wrong sub-topology with regard to destination, and then performing one of the two following steps:

provided the data cell is in the correct sub-topology, routing the cell to its destination within the sub-topology by using a remaining group of bits of the data cell destination address for routing table lookup, provided the data cell is in a wrong sub-topology, forwarding the cell to the top topology, wherein the routers within the top-topology use the first group of N−n bits of the destination address of the data cell for routing table look-up hereby routing the cell to its correct top node/sub-topology.

In a preferred embodiment a comparator of size N−n may be used for determining whether the data cell is in the correct sub-topology. Routing control may, in another preferred embodiment, be performed in a router by a register, the register indicating whether a router belongs to a top topology or a sub-topology, and controlling which group of the destination address to be used for router table look-up.

The method may include, provided the data cell is in a wrong sub-topology, forwarding the cell to the top topology by utilizing a configuration bit included in the register, indicating the path to the top topology.

In another preferred embodiment the method comprises using a mask for sub-topology determination increasing the number of paths between the sub-topologies.

In accordance with a second aspect the invention provides a programmable, distributed network routing system for routing data cells in a multi-node communication network, the network comprising a plurality of routers, the routers forming a top topology and at least one sub-topology, each sub-topology being strictly hierarchical dependent on the parent node in the top topology, the number of sub-topologies being $2^{N-n}$, the destination address of a data cell being N bit, each router comprising a router table having a size of $2^{N-n}$ bit, and a register operative to performing routing control indicating whether the router belongs to a top topology or a sub-topology, and controlling which part of the destination address to be used for table lookup, the register further including means for determining whether the data cell is in a correct or a wrong sub-topology with regard to destination.

In another preferred embodiment of the invention the determining means includes a comparator of size N−n. A configuration bit indicating the path to a top topology may be included in the register.

The determining means may further comprise a mask for sub-topology determination providing a plurality of paths between sub-topologies. The register may then further include a configuration bit indicating the path to a top topology or another sub-topology.

With some topology restrictions, a routing table of $2^n$ entries, where n<N, and with a SAN DestinationID that consists of N bits, routing SANs using the full address space can be made by partitioning the network topology into $2^{(N-n)}$ sub-topologies (levels).

Each sub-topology will have a fixed maximum size, and the routing table must have at least as many entries as the size of the biggest of these. If a topology needs to have as many as 512 nodes on one level, a lookup table with 512 entries is required. Partitioning a topology into just one level, i.e. ordinary table routing, would give the most flexible solution. The disadvantage of this would be, as mentioned, that the size of the topology would be very limited. Having several levels will reduce the flexibility, but will make it possible to use the whole SAN address space with reasonable table sizes, and at the same time keep lookup latency very low.

The decision on which part of the DestinationID to be used (i.e. e.g. DestinationID[(N−1):((N−1−n)] or DestinationID[n−1:0]) for table lookup can e.g. be based on configuration bits. In addition to the table, there is need for a n-bit comparator for the bits not used for the table lookup. The output from the comparator is used by the routing units, not being on the top level, to accommodate traffic between different sub-topologies. A configuration bit saying whether the routing unit will bring a packet to a higher level if the comparator says its destination is in another sub-topology, is also required.

The invention combines a relatively small routing table with a routing mask in a way that makes it possible to use the whole network address space, keeping both routing table latency minimal and chip area small.

The method and apparatus according to the invention also provide a more optimal way of using routing-tables. The routing differs from ordinary table routing in that the part of the destination address (DestinationID) used for table lookup is variable.

BRIEF DESCRIPTION OF DRAWINGS

The above and further advantages may be more fully understood by referring to the following description and accompanying drawings of which.

DETAILED DESCRIPTION

The example embodiments of the invention are described in relation to a SAN. However, the invention is equally applicable to any other networks, like LAN/WAN/etc., and the present invention shall not be considered to be limited to SAN.

Figure 1:
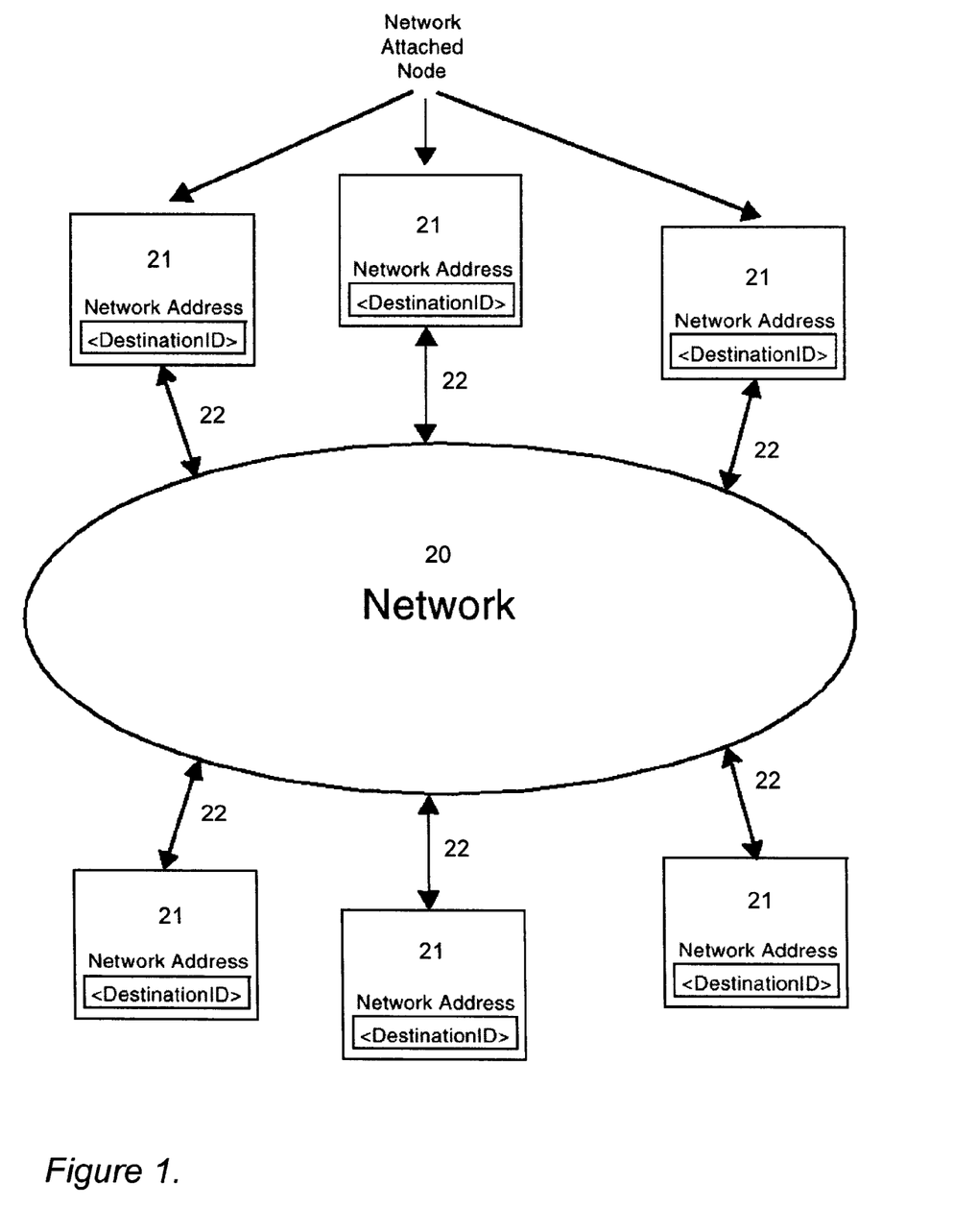
FIG. 1 presents a general-purpose data communication network into which the present invention may be implemented.
Figure 2:
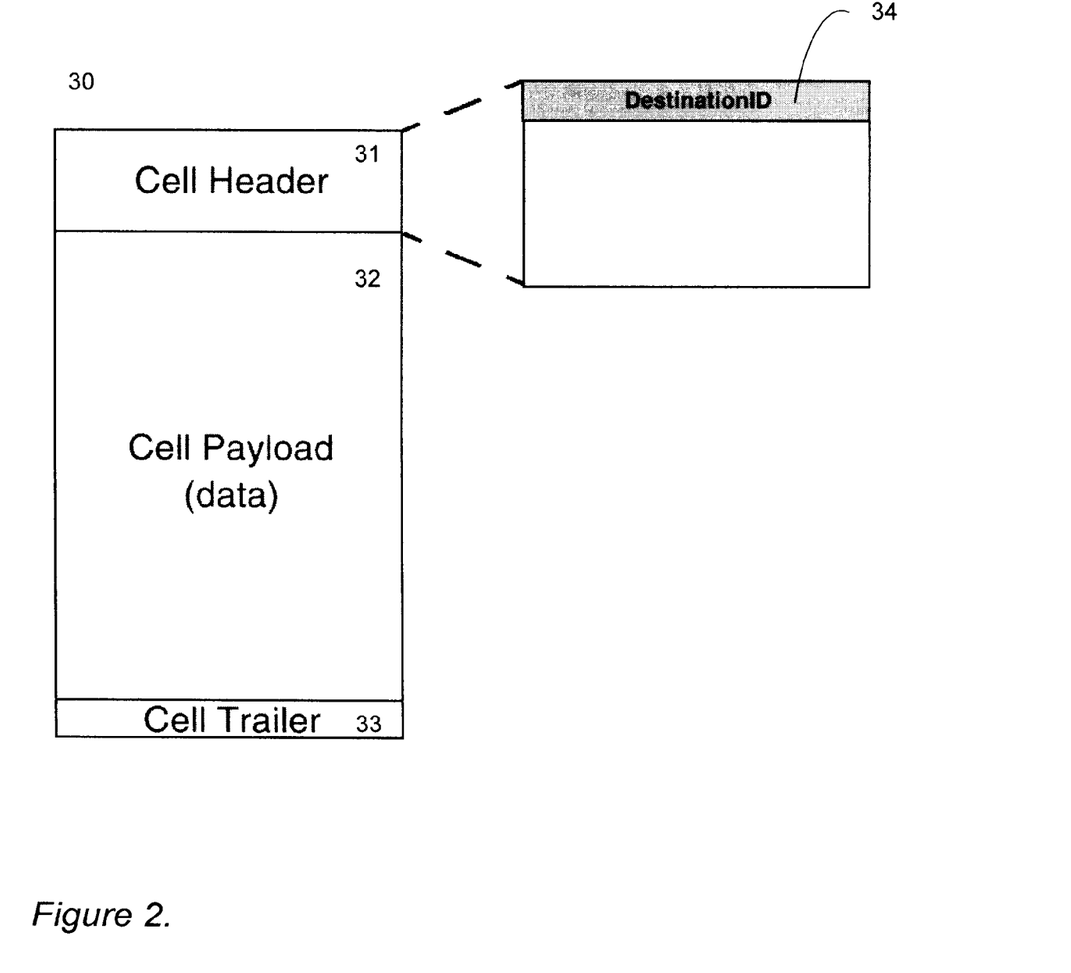
FIG. 2 shows a general-purpose cell that can be routed in the network in FIG. 1 in accordance with the present invention.

The same reference numerals are used throughout the several drawings. FIG. 1 presents a general purpose data communication network. The network 20 serves as a communication medium for the nodes attached thereto. Each network-attached node 21 uses a bi-directional communication link 22 as the network connectivity medium. Each network-attached node has a unique network address labeled DestinationID in FIG. 1. Communication between the attached nodes is achieved by sending cells between the nodes. Each cell is equipped with a DestinationID, so that the network may route the cell to the correct destination (network-attached node) by inspecting the cell's DestinationID. A general purpose cell 30 is shown in FIG. 2. A header 31, which usually consists of information about the sender/recipient's address (i.e. DestinationID 34), followed by a data field 32 (usually referred to as payload), and a cell trailer 33, or a cell delimiter, which in the general case typically will be some sort of error-detecting code (e.g. CRC (Cyclic-redundancy-check)) constitute the cell 30.

Figure 3:
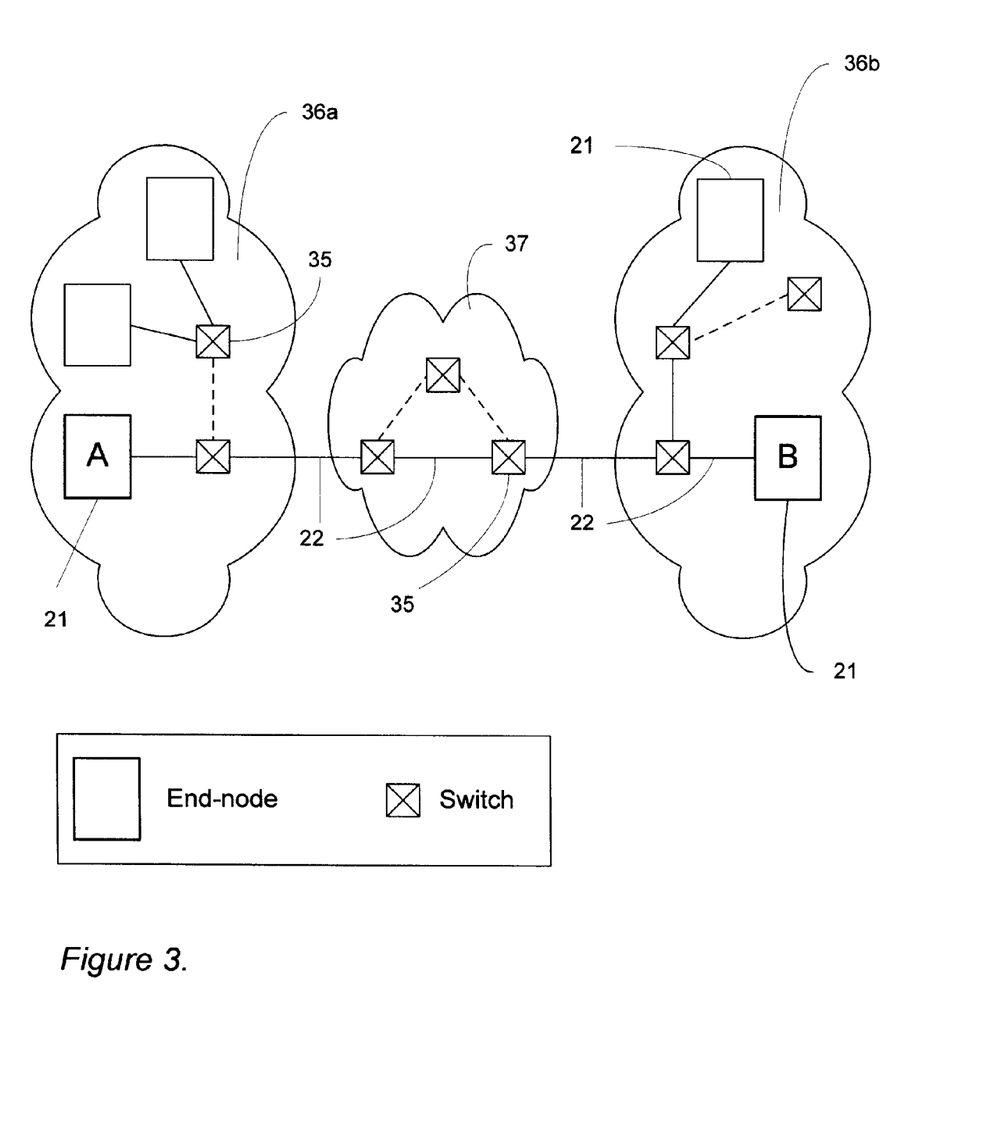
FIG. 3 shows an overview of a network communication path between node A and node B.

FIG. 3 shows an overview of a network communication path between nodes A and B 21. Node A 21 is located in one sub-topology 36a while node B 21 is located in another sub-topology 36b. A cell transmitted by node A is routed from sub-topology 36a to top-topology 37 to sub-topology 36b via switches 35 on its way to node B. The switches in the network are interconnected by bi-directional communication links 22.

Figure 4:
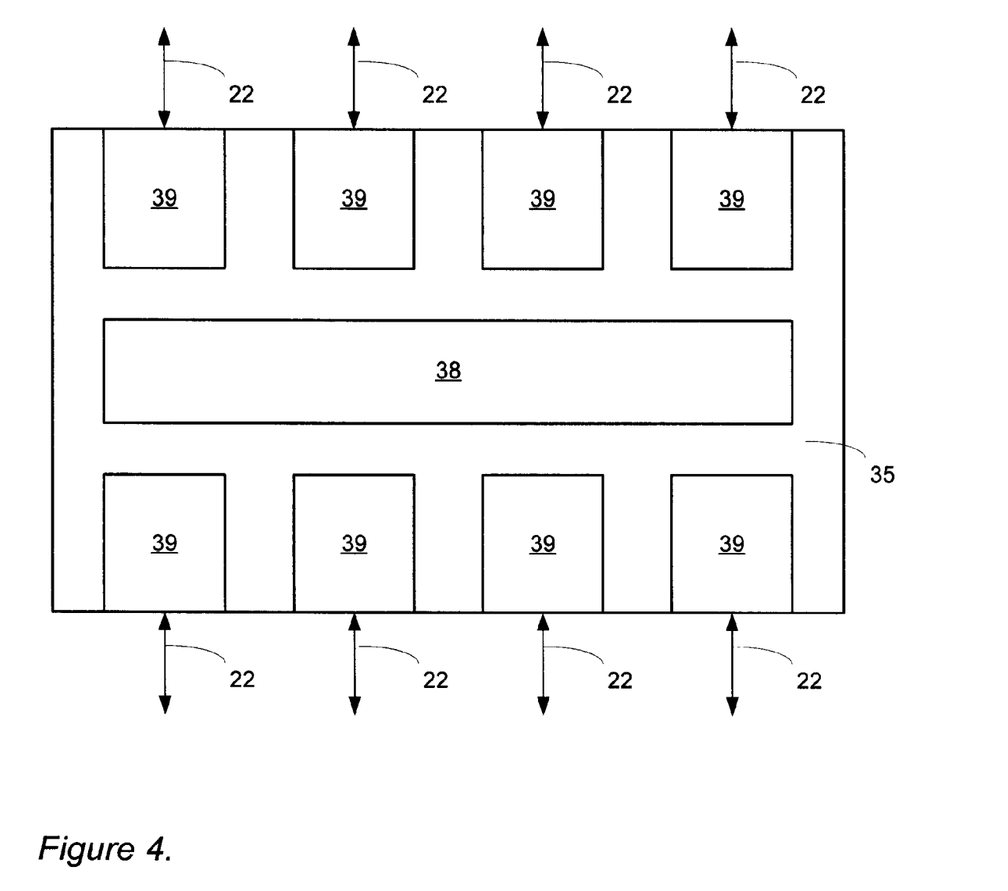
FIG. 4 shows a schematic of a switch that may be used in the network in FIG. 3.

FIG. 4 shows an overview of a switch 35. A switch consists of several input/output ports 39. Each port 39 has a bi-directional communication link 22. Each port can route packets (cells) to any other port via a switching device 38. The switching device could e.g. be a crossbar or a bus.

Figure 5:
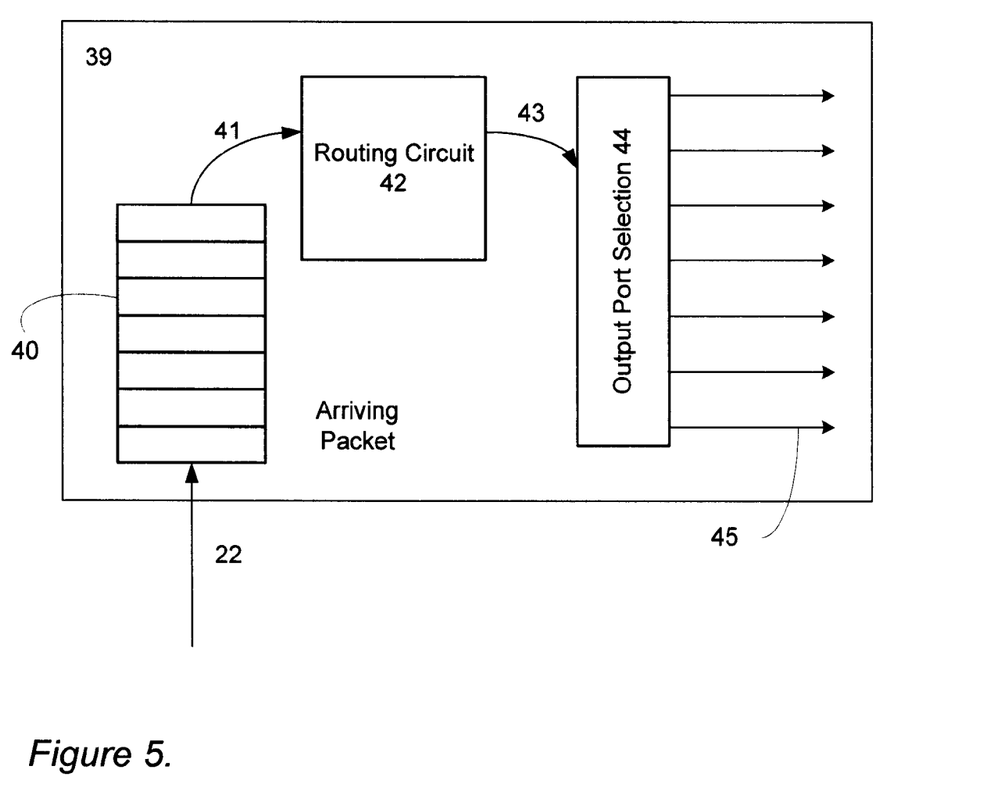
FIG. 5 shows an overview of the logic used for cell routing within a port in the switch in FIG. 4.

FIG. 5 shows an overview of the logic used for cell routing within a port 39 in the switch in FIG. 4. When a cell arrives at a port from a communication link 22, it is typically written into a buffer 40. The DestinationID of the cell is forwarded to a routing circuit 42, which determines which output port the cell shall be routed to. The routing circuit returns the selected output port 43 and forwards this information to the output port scheduler logic 44, which in turn informs the selected output port, by using control lines 45, that it has a cell destined for that output port. (An example embodiment of the switch in FIGS. 4 and 5 is described more fully in co-pending U.S. patent application Ser. No. 09/520,063, entitled "N×N Crossbar Packet Switch", assigned to the assignee of the present application, the relevant disclosures of which co-pending application are incorporated herein by reference).

In the following description of a preferred embodiment of the present invention, we assume a network with 16-bit DestinationID addresses and that the maximum size of a sub-topology level is 256 nodes. Furthermore, a switch with 8 ports is assumed. The present invention is however not limited to this.

A 16×16 RAM block is used as the routing table, providing a 256-entry routing table. This routing table can be programmed by software. Thus, a network with 256 end-nodes can be routed entirely by using routing tables.

A register RCTRL is used for routing control. The RCTRL register is defined in Table 1, and may be programmed by software,

TABLE 1

| RCTRL | |
|---|---|
| Name | Comment |
| RCTRL.sub | If set, indicates that the node/switch is located in a sub-topology |
| RCTRL.sublo | Determines which part of the DestinationID of an incoming cell to be used for routing |

TABLE 1-continued

| | RCTRL |
|---|---|
| Name | Comment |
| | table lookup |
| RCTRL.totop[2:0] | Indicates the path to the top topology |
| RCTRL.smask[3:0] | Used to increase the number of paths between sub-topologies (up to 16 paths) |

RCTRL.sublo and RCTRL.sub control which half of the cell's DestinationID to be used for indexing the routing table.

Figure 6:
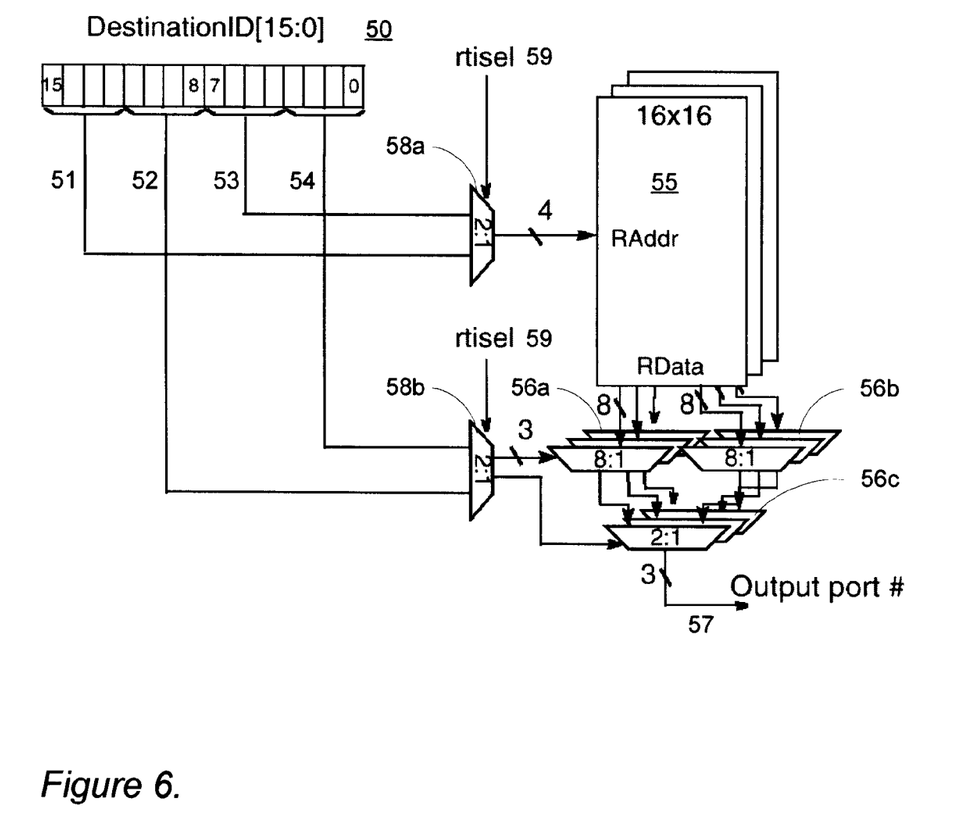
FIG. 6 is a schematic outline of the routing table and routing table index selection in accordance with an embodiment of the present invention.

FIG. 6 illustrates the routing table and the associated logic. The routing table consists of three 16×16 RAM blocks 55. Whenever a new cell arrives at the switch port, the DestinationID 50 of the cell is used for indexing the routing table 55. The output of the routing table 55 and multiplexor circuits 56a–c, is a 3-bit number 57. This will be more fully explained below.

The output of the routing table 55 is three 16-bit numbers; one 16-bit number from each of the three RAM blocks. The 8 most significant bits of each of these 16-bit numbers are input to three 1-bit 8:1 multiplexors 56a, respectively, and the 8 least significant bits are input to three 1-bit 8:1 multiplexors 56b. The three 1-bit outputs of multiplexors 56a and multiplexors 56b are fed into three 1-bit 2:1 multiplexors 56c, respectively. A 3-bit number 57, indicating the output port to which the cell is to be forwarded, is output from the multiplexors 56c.

The DestinationID 50 is divided into four parts: DestinationID[15:12] 51, DestinationID[11:8] 52, DestinationID[7:4] 53, DestinationID[3:0] 54, Other groupings of the bits in the DestinationID are possible, and the invention shall not be considered to be limited to the division above.

A 2:1 multiplexor 58b selects whether DestinationID [11:8] 52 or DestinationID[3:0] 54 shall be used as selector inputs to the 8:1 multiplexors 56a and 2:1 multiplexors 56c. Similarly, a 2:1 multiplexor 58a is used to select whether DestinationID[15:12] 51 or DestinationID[7:4] 53 shall be used to index (address) the routing table 55.

Multiplexor 58a and multiplexor 58b are controlled by the value of the routing table index selection (RTISEL) 59. The routing table index selection is defined in Table 2 on the basis of the values for RCTRL.sub and RCTRL.sublo. Depending on the value of RTISEL, either the 8 most significant bits of the DestinationID (DestinationID[15:12] 51 and DestinationID[11:8] 52, (RTISEL is '1')), or the 8 least significant bits of the DestinationID (DestinationID [7:4] 53 and DestinationID[3:0] 54, (RTISEL is '0')) are used to perform a routing decision based on the routing table 55.

TABLE 2

| Routing table Index | | | |
|---|---|---|---|
| RCTRL.sub | RCTRL.sublo | Routing table index | RTISEL |
| 0 | 0 | DestinationID[7:0] | 0 |
| 0 | 1 | DestinationID[15:8] | 1 |
| 1 | 0 | DestinationID[15:8] | 1 |
| 1 | 1 | DestinationID[7:0] | 0 |

If RCTRL.sub and RCTRL.sublo both are reset ('0') or both are set ('1'). RTISEL 59 is '0', and the 8 least significant bits of the incoming cell's DestinationID are used for performing the routing decision. If RCTRL.sub and RCTRL.sublo are not equal, RTISEL 59 is '1', and the 8 most significant bits of the incoming cell's DestinationID are used for performing the routing decision.

Figure 7:
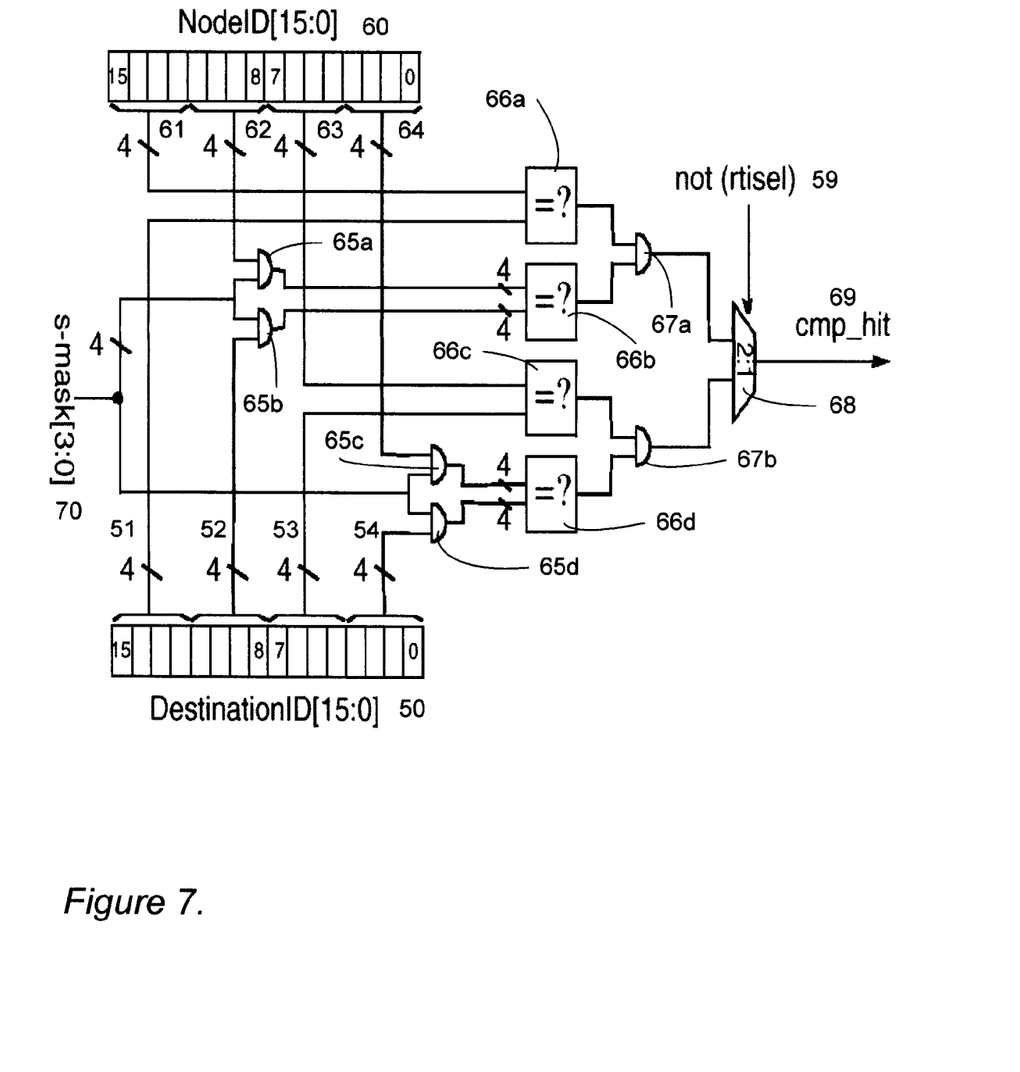
FIG. 7 is a schematic outline of the comparator logic in accordance with an embodiment of the present invention.
Figure 7A:
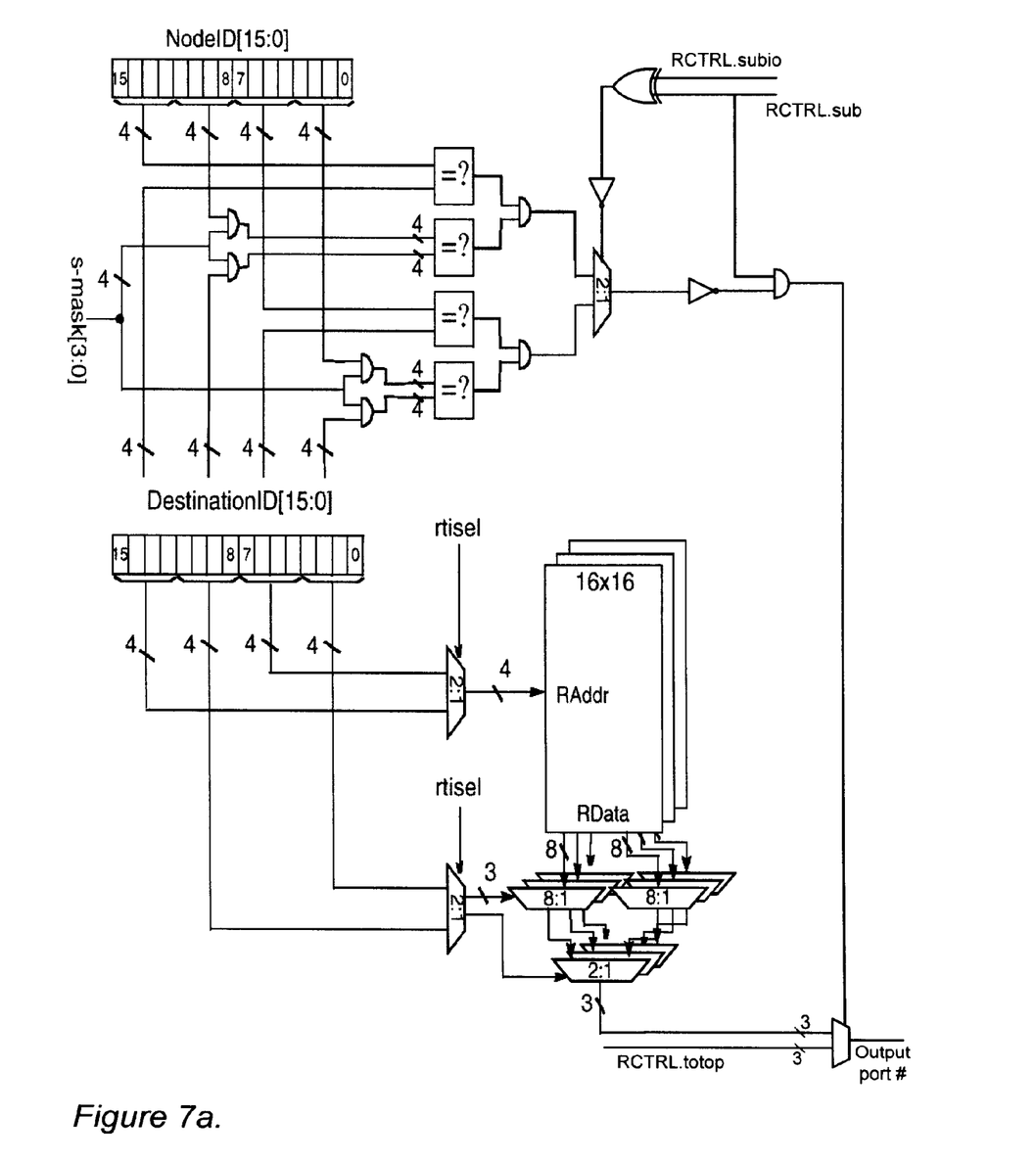
FIG. 7a is FIGS. 6 and 7 combined, forming a routing system.

Topologies larger than 256 nodes may be made by combining the routing table in FIG. 6 with comparator logic. The comparator logic is illustrated in FIG. 7. FIG. 7a shows how the routing table in FIG. 6 is connected to the comparator logic in FIG. 7, forming a routing system.

In FIG. 7, a 16-bit register called NodeID is used. The value of the NodeID 60 is either used as a mask for sub-topology determination, or is used as a nodes final address. If the NodeID 60 is used as a mask, the network makes the assumption that none intermediate nodes (e.g. switches) may be accessed by a cell. In other words, a node cannot address an intermediate node by sending an ordinary cell to an intermediate node.

In the latter case, if the NodeID 60 is used as a network address, one node can access intermediate nodes. This is required if end nodes are to access e.g. registers within intermediate nodes through the network. However, these intermediate nodes will consume one address each, thus limiting the total number of endnodes possible to address. The description below applies to both the definitions of the NodeID 60.

The content of the NodeID 60 register and the cell's DestinationID 50 are utilized as an input to comparator logic 66a–d.

Specifically, DestinationID[15:12] 51 and NodeID[15:12] 61 are compared by the comparator 66a, DestinationID [11:8] 52 and NodeID[11:8] 62 are compared by the comparator 66b, DestinationID[7:4] 53 and NodeID[7:4] 63 are compared by the comparator 66c, DestinationID[3:0] 54 and NodeID[3:0] 64 are compared by the comparator 68d. It the DestinationID is equal to the NodeID, the output of the respective comparator is '1'. If the DestinationID is not equal to the NodeID, the output of the respective comparator is '0'.

The outputs of comparator 66a and 66b are fed into the logical AND gate 67a. Hence, if the 8 most significant bits of DestinationID 50 (i.e. DestinationID[15:8]) are equal to the 8 most significant bits of the NodeID 60 register (i.e. NodeID[15:8]), the resultant output from the AND gate 67a is '1'. On the other hand, if they are not equal, the resultant output from the AND gate 67a is '0'.

The outputs from comparator 66c and 66d are fed into the logical AND gate 67b. Hence, if the 8 least significant bits of DestinationID 50 (ie. DestinationID[7:0]) are equal to the 8 least significant bits of the NodeID 60 register (i.e. NodeID[7:0]), the resultant output from AND gate 67b is '1'. On the other hand, if they are not equal, the resultant output from AND gate 67b is '0'.

The resultant outputs from logical AND gates 67a and 67b are fed into a 2:1 multiplexor 68. The output from the multiplexor 68, a value called CMP_HIT; is used to select which part of the DestinationID to be used for routing determination (i.e. either the 8 most significant bits of DestinationID or the 8 least significant bits of DestinationID). The multiplexor is controlled by the inverted RTISEL 59 (not (rtisel) in FIG. 7). i.e., if the 8 least significant bits of the DestinationID 50 are used as an input for indexing the routing table 55, the 8 most significant bits of DestinationID are used for the comparison. Similarly, if the 8 most significant bits of DestinationID are used to index the routing table 55, the 8 least significant bits are used for comparison.

Figure 8:
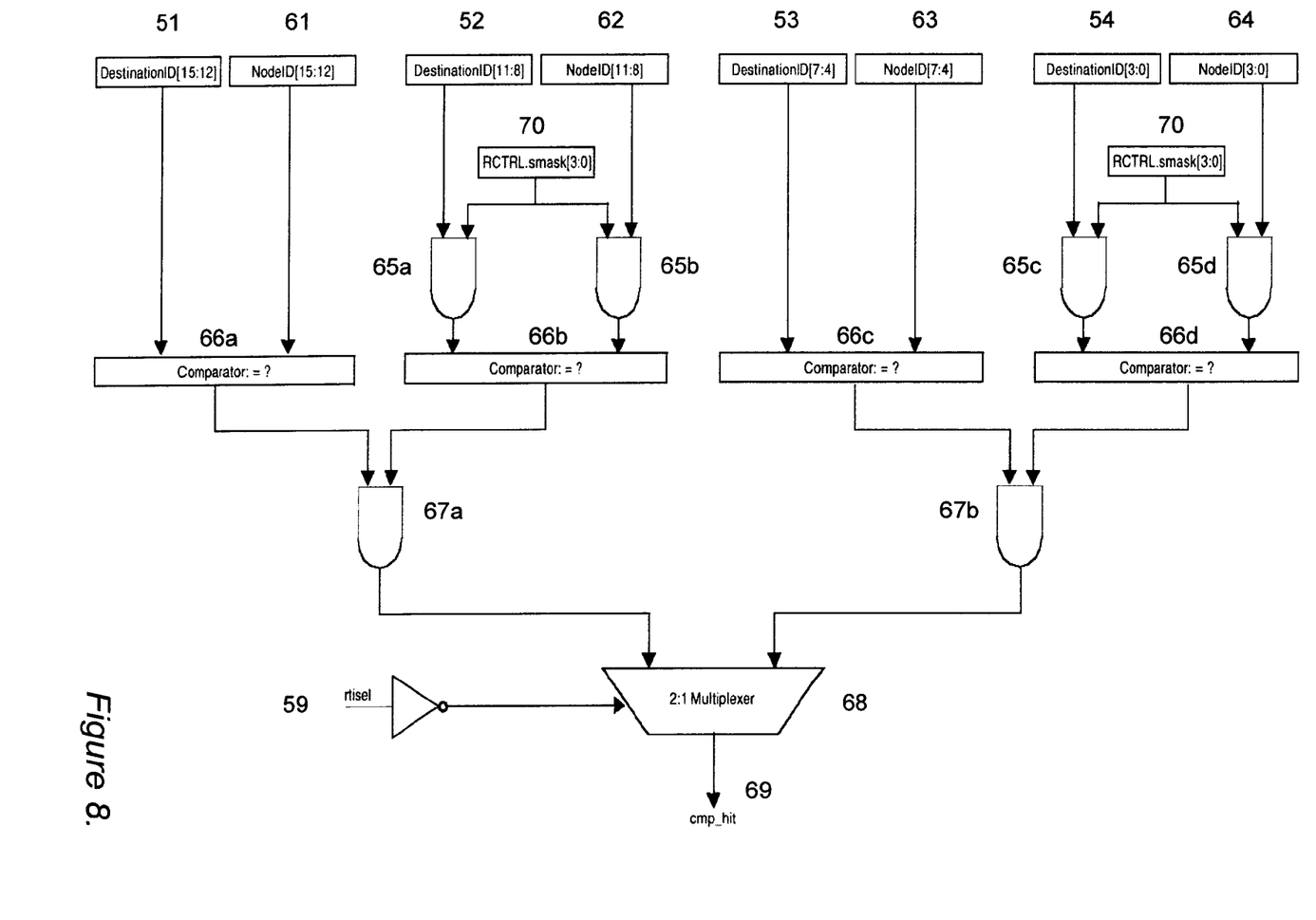
FIG. 8 is a schematic outline of the algorithm in accordance with the present invention.

The output of the multiplexor 68 is a signal CMP_HIT 69. If CMP_HIT 69 is '1', the comparison was successful (i.e. equal). On the other hand if CMP_HIT 69 is '0', the comparison was unsuccessful (i.e. not equal). FIG. 8 is a flow chart illustrating the routing comparison. The same reference numerals designate the same elements in FIGS. 7 and 8.

To build a network with more than 256 nodes the present invention requires a topology to be partitioned into a top topology and 1 to 256 sub-topologies.

All nodes (and switches) which exist within the top topology will have RCTRL.sub set to zero ('0'), indicating that the node/switch belongs to the top topology. All other nodes must be part of a sub-topology of one of the nodes in the top topology. All nodes in a sub-topology will have RCTRL.sub set to one ('1').

Figure 10:
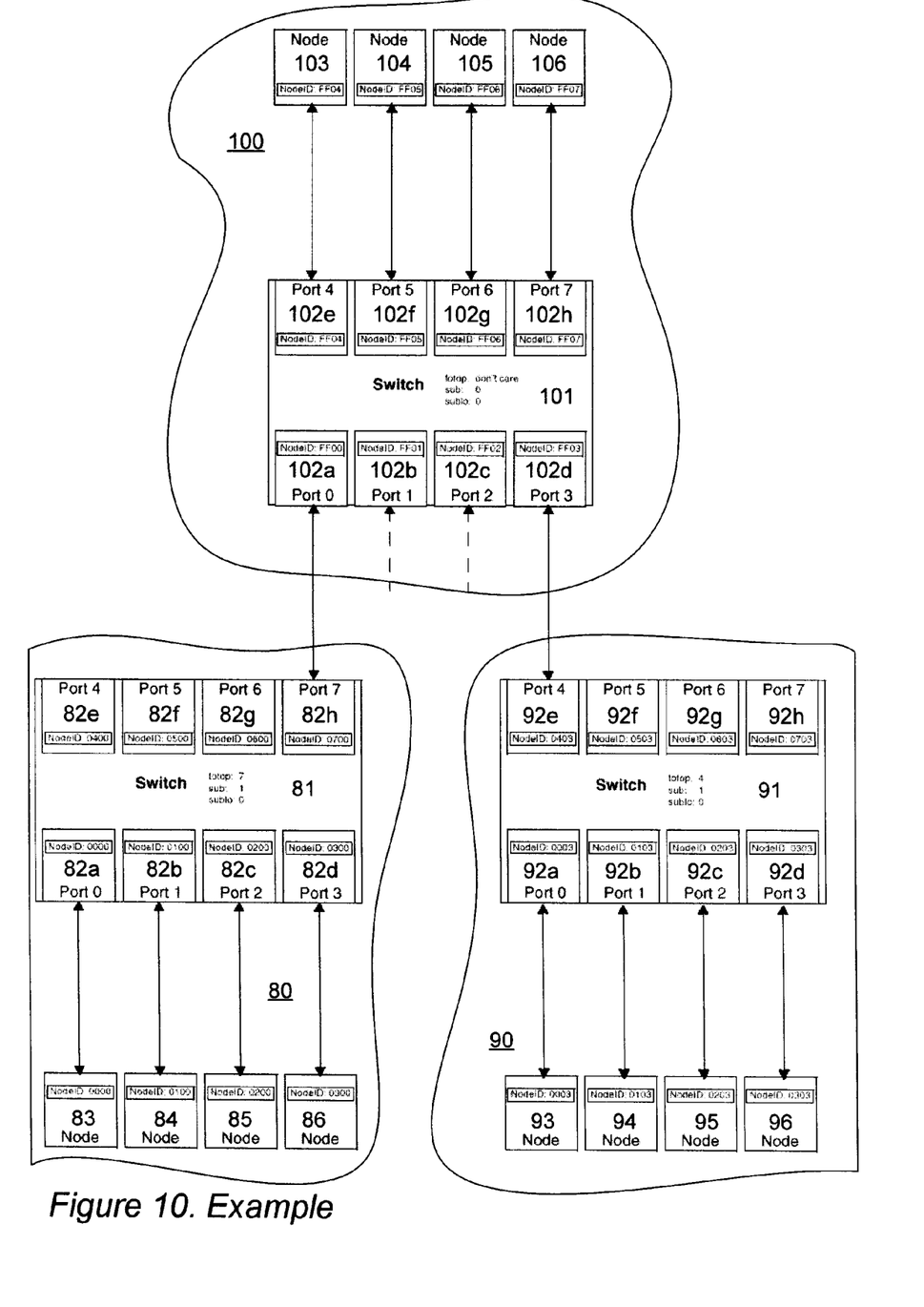
FIG. 10 shows an example of how the present invention may be used to route cells in a fat-tree network.

The above impose the following requirement on the system: a sub-topology must be strictly hierarchical dependent on the parent node in the top topology, as e.g. shown in FIG. 10. A parent node within the top topology has then at least 8-bits of NodeID, either 8 MSBs (most significant bits) or 8 LSBs (least significant bits), in common with all of its children nodes in the sub-topology. This implies that the top topology at a maximum car, contain 256 nodes, and each of the nodes in the top topology can have one sub-topology, each sub-topology consisting of up to 256 nodes. This is a result of the description of the preferred embodiment assuming a network with 16-bit NodeID addresses and a maximum size of a sub-topology level of 256 nodes.

A RCTRL.smask 70 (see Table 2) is used when several (up to 16) paths between sub-topologies are needed. The RCTRL.smask 70 is shown in FIGS. 7 and 8.

The RCTRL.smask is input to AND gates 65a–d. The RCTRL.smask is only applied to Destination ID([11:8]/NodeID[11:8] and DestinationID[3:0]/NodeID[3:0]. The default value of RCTRL.smask is 0xF (hexadecimal). Hence, for a comparison to be true (i.e. CMP_HIT 69 is '1'), either DestinationID[15:8] must be equal to NodeID[15:8] with RTISEL 59 equal to '0', or DestinationID[7:0] must be equal to NodeID[7:0] with RTISEL 59 equal to '1'.

The value or the RCTRL.smask controls the number of bits of DestinationID[11:8] or DestinationID[3:0] that have to match NodeID[11:8] or NodeID[3:0], respectively, for a comparison to be true. By changing the value of RCTRL.smask, not all bits (depending on the value of RCTRL.smask) of DestinationID[11:8] or DestinationID [3:0] have to equally match NodeID[11:8] or NodeID[3:0]. i.e. sub-topologies with the same value of DestinationID [15:12] 51 or DestinationID[7:4] 53 will appear as belonging to the same sub-topology if the bit-masked (by using RCTRL.smask) value of DestinationID[11:8] or DestinationID[3:0] matches the bit-masked value of NodeID [11:8] or NodeID[3:0].

As can be seen from FIG. 7a, the 3-bit output 57 from the multiplexor 56c is input to a 2:1 multiplexor 77 together with RCTRL.totop 71 (see Table 1). The resultant output from the multiplexor 77 determines which output port to route the packet to. RCTRL.sub 74 and CMP_HIT 69 inverted is fed into a AND gate 72. The output from this AND gate is used as a selector input to the multiplexor 77. In FIG. 7a; the generation of RTISEL 59 can also be seen. RCTRL.sublo 75 and RCTRL.sub is fed into XOR-gate 76, and the output of this is RTISEL 59.

Figure 9:
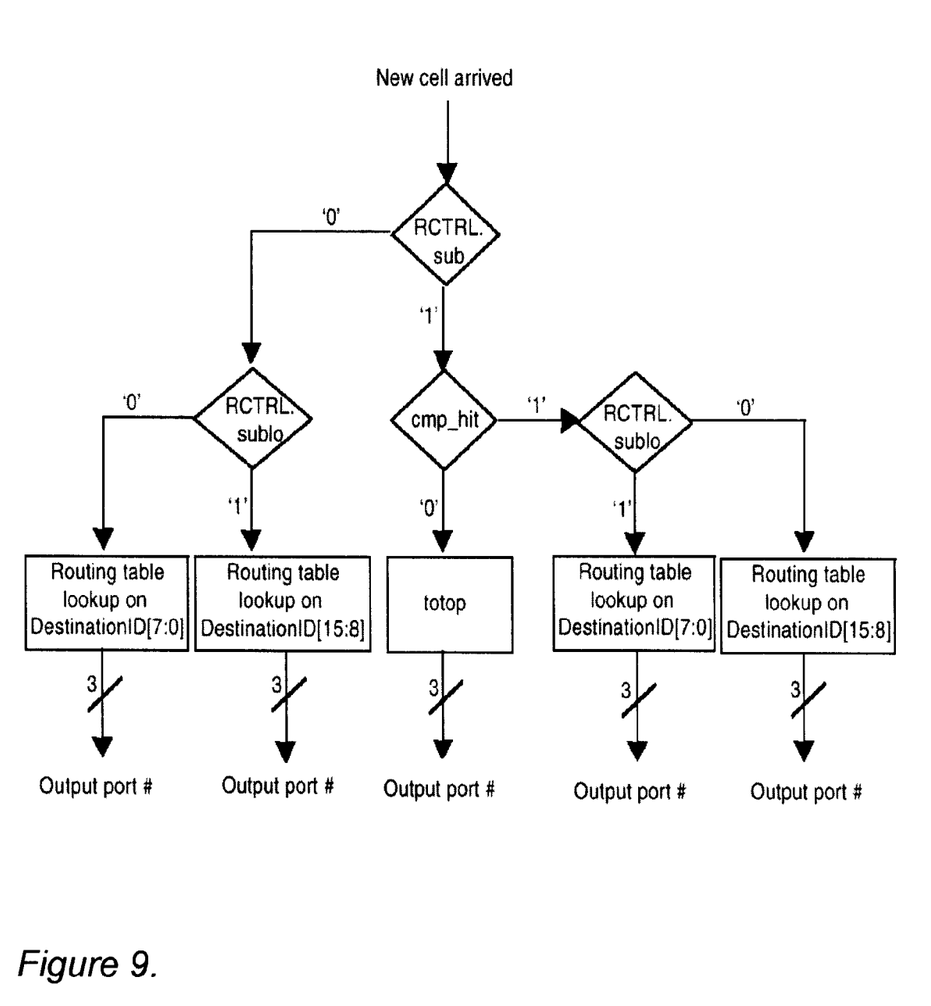
FIG. 9 is a flow diagram illustrating the complete routing decision at a switch point in accordance with the present invention.

FIG. 9 illustrates the complete routing decision at a switch point. The nodes in a sub-topology that are on a path to the top topology, will have the RCTRL.totop (see Table 1) bits set to the respective output port that is on the path to the top topology. Once a packet is dispatched from a node in a sub-topology, and as long as the correct half of the DestinationID matches the corresponding parent NodeID bits, the packet is strictly routed within the sub-topology. In this case, table lookup can be safely used. Once a packet with a DestinationID not matching the sub-topology address is detected, this packet must be passed up to the top topology, where it can be routed to the correct top node or sub-topology. These packets find their way to the top topology by following a path given by the RCTRL.totop bits.

Whenever a new cell arrives at a switch input port 39 (see FIG. 4) and the switch port is part of a top topology having RCTRL.sub set to '0', only the routing table is used to determine to which switch output port 39 the cell is to be routed. The value of RCTRL.sublo determines which part of the DestinationID to be used to index the routing table in the switch port. If RCTRL.sublo is set to '0', DestinationID[7:0] is used to index the routing table. On the other hand, if RCTRL.sublo is set to '1', DestinationID[15:8] is used to index the routing table.

Whenever a new call arrives at a switch input port 39 (see FIG. 4) and the switch port is part of a sub-topology having RCTRL.sub set to '1', the comparator logic (see FIG. 7) is used to determine whether the cell belongs to this sub-topology given by the CMP_HIT 69. If the cell does not belong to tho current sub-topology, the cell is routed to the output port given by the 3-bit value of RCTRL.totop. If the call belongs to the current sub-topology, the routing table is used to determine to which switch output port 39 the cell is to be routed. The value of RCTRL.sublo determines which part of the DestinationID to be used for indexing the routing table in the switch port 39. It RCTRL.sublo is set to '1', DestinationID[7:0] is used to index the routing table. On the other hand, if RCTRL.sublo is set to '0', DestinationID [15:8]is used to Index the routing table.

FIG. 10 is an example of how the present invention can be used to route cells in a fat-tree network. FIG. 10 contains one top topology 100 (RCTRL.sub set to '0' in switch 101) and two sub-topologies 80 and 90 (RCTRL.sub set to '1' in respectively switch 81 and switch 91).

In the top topology 100 RCTRL.sublo is set to '0' in switch 101. Hence, the 8 least significant bits of the DestinationID are used to index the routing table in the top topology 100. The 8 most significant bits of NodeID in all the nodes in the top topology (Nodes 102a–h, 103, 104, 105, 106) are equal (i.e. 'FF').

In the sub-topologies 80 and 90 RCTRL.sublo is set to '0' in switches 81 and 91. Hence the 8 most significant bits of the DestinationID are used to index the routing table in the switches 81 and 91. The 8 least significant bits of NodeID in all nodes in the sub-topologies 80 (Nodes 82a–h, 83, 84, 85, 86) are equal (i.e. '00'). Similarly, the 8 least significant bits of NodeID in all the nodes in the sub-topology 90 (Nodes 92a–h, 93, 94, 95, 96) are equal (i.e. '03').

In sub-topology 80 RCTRL.totop is set to '7' in the switch 81, indicating that the output port on the path to the top-topology is port 7 (i.e. 82h), Whereas in sub-topology 90 RCTRL.totop is set to '4' in the switch 91, indicating that the output port on the path to the top-topology is port 4 (i.e. 82e).

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

What is claimed is:

1. A method of routing a data cell through a hierarchy of routers arranged into a top-topology and one or more sub-topologies, the method comprising:
   receiving a data cell at a first router, wherein:
      the data cell includes a destination ID;
      the first router has a router ID; and
      each of the destination ID and the router ID comprises a first portion and a second portion;
   comparing a topology portion of the destination ID to a corresponding topology portion of the router ID, wherein:
      said topology portion of the router ID is configured to identify a topology of routers in which the first router is located; and
      the topology is either a top-topology of routers or one of multiple sub-topologies of routers hierarchically depending from the top-topology;
   if said topology portion of the destination ID does not match said topology portion of the router ID:
      reading a control register in the first router to identify a top output port of the first router configured to couple the first router to the top-topology; and
      forwarding the data cell on the top output port; and
   if said topology portion of the destination ID matches said topology portion of the router ID:
      selecting one of the first portion and the second portion of the destination ID, wherein the other of the first portion and the second portion of the destination ID comprises said topology portion of the destination ID;
      using said selected portion of the destination ID to lookup in a routing table a first output port for forwarding the data cell toward a node having the destination ID; and
      forwarding the data cell on the first output port.

2. The method of claim 1, further comprising, prior to said comparing:
   determining, from a first value stored in the control register, whether the first router is located in one of the multiple sub-topologies; and
   based on a second value stored in the control register, selecting:
      one of the first portion and the second portion of the destination ID as comprising said topology portion of the destination ID; and
      one of the first portion and the second portion of the router ID as comprising said topology portion of the router ID.

3. The method of claim 2, further comprising:
   masking said selected portion of the destination ID and said selected portion of the router ID using a third value stored in the control register;
   wherein said topology portion of the destination ID is said masked selected portion of the destination ID; and
   wherein said topology portion of the router ID is said masked selected portion of the router ID.

4. A computer readable storage medium storing instructions that, when executed by a computer, cause the computer to perform a method of routing a data cell through a hierarchy of nodes arranged into a top-topology and one or more sub-topologies, the method comprising:
   receiving a data cell at a first router, wherein:
      the data cell includes a destination ID;
      the first router has a router ID; and
      each of the destination ID and the router ID comprises a first portion and a second portion;
   comparing a topology portion of the destination ID to a corresponding topology portion of the router ID, wherein:
      said topology portion of the router ID is configured to identify a topology of routers in which the first router is located; and
      the topology is either a top-topology of routers or one of multiple sub-topologies of routers hierarchically depending from the top-topology;
   if said topology portion of the destination ID does not match said topology portion of the router ID:
      reading a control register in the first router to identify a top output port of the first router configured to couple the first router to the top-topology; and
      forwarding the data cell on the top output port; and
   if said topology portion of the destination ID matches said topology portion of the router ID:
      selecting one of the first portion and the second portion of the destination ID, wherein the other of the first portion and the second portion of the destination ID comprises said topology portion of the destination ID;
      using said selected portion of the destination ID to lookup in a routing table a first output port for forwarding the data cell toward a node having the destination ID; and
      forwarding the data cell on the first output port.

* * * * *